US012622484B2

(12) United States Patent
Bartel et al.

(10) Patent No.: US 12,622,484 B2
(45) Date of Patent: May 12, 2026

(54) SYSTEM AND METHOD FOR FORMING A MOLDED COMPONENT WITH AN INSERT

(71) Applicant: NIKE, Inc., Beaverton, OR (US)

(72) Inventors: Aaron Bartel, Beaverton, OR (US);
Michael A. Hofmann, Taichung (TW);
Sam Lacey, Portland, OR (US); Geun Rok Park, Busan (KR); Manki Park, Busan (KR)

(73) Assignee: NIKE, Inc., Beaverton, OR (US)

( * ) Notice: Subject to any disclaimer, the term of this patent is extended or adjusted under 35 U.S.C. 154(b) by 125 days.

(21) Appl. No.: 18/518,703

(22) Filed: Nov. 24, 2023

(65) Prior Publication Data

US 2024/0081473 A1      Mar. 14, 2024

Related U.S. Application Data

(62) Division of application No. 17/111,945, filed on Dec. 4, 2020, now Pat. No. 11,857,025.

(Continued)

(51) Int. Cl.
*B29D 35/00*        (2010.01)
*A43B 13/04*        (2006.01)
(Continued)

(52) U.S. Cl.
CPC .......... *A43B 13/04* (2013.01); *B29D 35/0018* (2013.01); *B29D 35/122* (2013.01); *B29D 35/14* (2013.01); *B29D 35/142* (2013.01)

(58) Field of Classification Search
CPC ....... A43B 13/026; A43B 13/24; A43B 13/04; B29D 35/122; B29D 35/14;
(Continued)

(56) References Cited

U.S. PATENT DOCUMENTS

| 2012/0266490 A1 | 10/2012 | Atwal et al. |
| 2014/0215862 A1 | 8/2014 | Curl et al. |
| 2016/0001478 A1 | 1/2016 | Cook et al. |

FOREIGN PATENT DOCUMENTS

WO      WO-2019204197 A1      10/2019

OTHER PUBLICATIONS

European Patent Office (ISA), International Search Report and Written Opinion for PCT Application No. PCT/US2020/063377, mailed Mar. 9, 2021.

(Continued)

*Primary Examiner* — Monica A Huson
(74) *Attorney, Agent, or Firm* — Honigman LLP; Matthew H. Szalach; Jonathan P. O'Brien

(57) ABSTRACT

A method for forming a molded article having an insert includes temporarily protecting features of the insert during a molding process using a malleable plugging material. In one step, the method includes disposing a plug including the plugging material within a receptacle of the insert, where each receptacle includes an engagement feature. The insert and the plugging material are placed into a mold, and a liquid molding material is applied to an exterior surface of the insert. The liquid molding material is solidified, forming the molded article including the insert embedded in the solidified molding material. The molded article is removed from the mold, and the plugging material is removed from the receptacle of the insert that is embedded in the molded article to expose the engagement feature.

20 Claims, 12 Drawing Sheets

Related U.S. Application Data

(60) Provisional application No. 62/943,975, filed on Dec. 5, 2019.

(51) Int. Cl.
B29D 35/12 (2010.01)
B29D 35/14 (2010.01)

(58) Field of Classification Search
CPC    B29D 35/0018; B29D 35/128; B29D 35/142;
A43C 15/161
See application file for complete search history.

(56)                        References Cited

OTHER PUBLICATIONS

USPTO, Non-Final Office Action for U.S. Appl. No. 17/111,945, mailed Dec. 7, 2022.

102, 102b 102, 102c 102, 102c 102, 102b 102, 102c

SYSTEM AND METHOD FOR FORMING A MOLDED COMPONENT WITH AN INSERT

CROSS REFERENCE TO RELATED APPLICATION

This application is a division of U.S. patent application Ser. No. 17/111,945, filed on Dec. 4, 2020, which claims priority under 35 U.S.C. § 119(e) to Provisional U.S. Patent Application No. 62/943,975, filed on Dec. 5, 2019, the contents of which are incorporated by reference in their entirety.

FIELD

The present disclosure relates generally to methods and systems for forming molded components with inserts.

BACKGROUND

This section provides background information related to the present disclosure, which is not necessarily prior art.

Articles of footwear conventionally include an upper and a sole structure. The upper may be formed from any suitable material(s) to receive, secure, and support a foot on the sole structure. Sole structures generally include a layered arrangement extending between a ground surface and the upper. One or more components of the article of footwear, and particularly, the sole structure, may be formed using various molding systems and processes, such as injection molding and compression molding systems.

In some instances, the molded components may include a molded material that is initially provided to the molding system in a fluid state and then solidified to form the molded component. Here, it may be desirable to provide the molded component with one or more pre-formed inserts which become bonded to the molded component. For example, inserts configured for attaching periphery components, such as cleats or studs, may be embedded within the molded material of the molded component.

DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
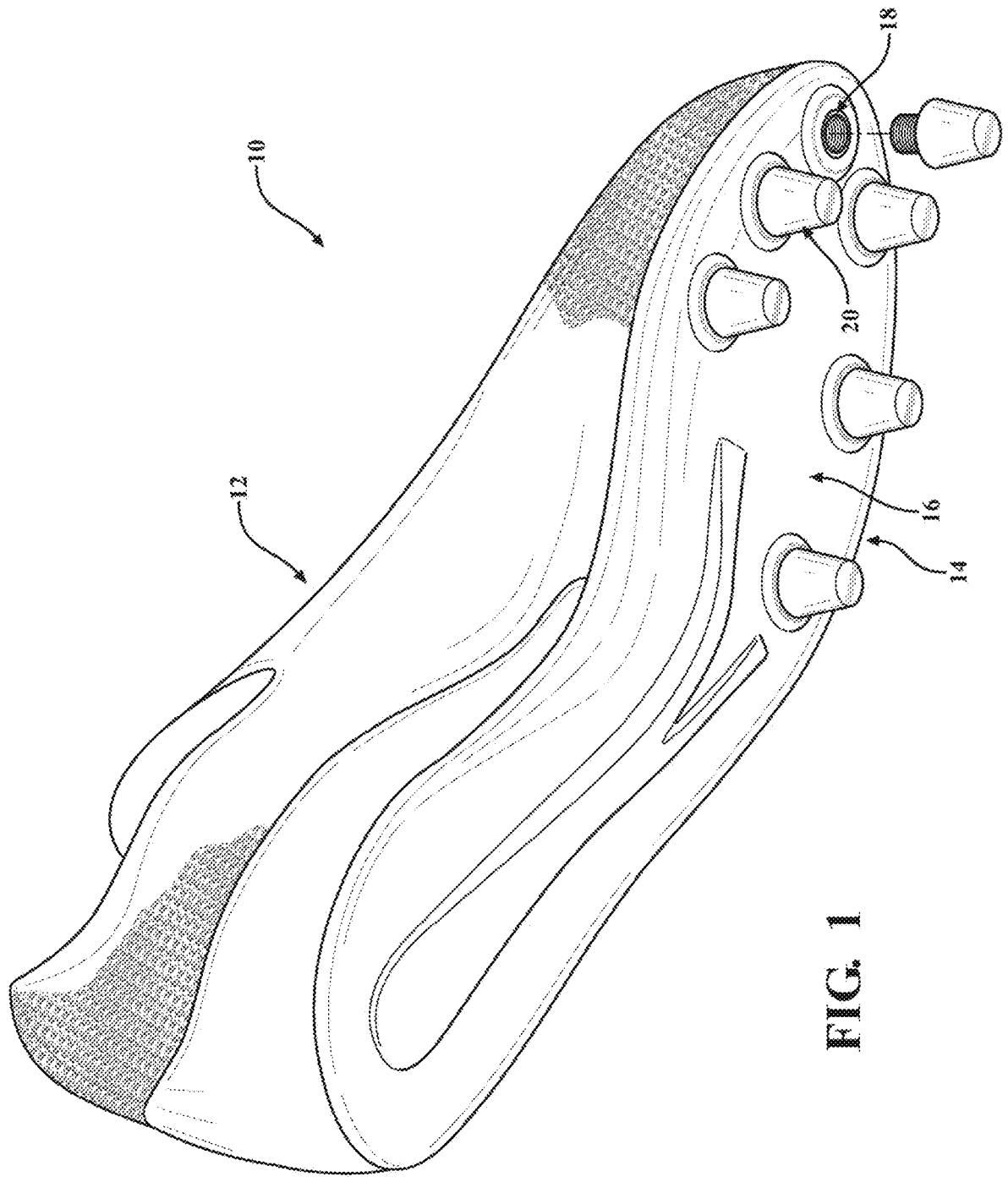
FIG. 1 is a bottom perspective view of an article of footwear including a sole structure formed according to the principles of the present disclosure.

The present disclosure is directed to methods of manufacturing molded articles, systems for use in the methods, molded articles made using the methods and/or the systems, and articles of footwear incorporating the molded articles. In some examples, molded articles are formed with inserts to provide critical elements of the molded articles with more durable or precise features. For example, where molded articles are formed using composite materials, metal or polymeric inserts may be provided within the molded article to provide rigid and durable attachment points for peripheral items, such as detachable traction elements. The methods and systems of the present disclosure are directed towards providing an efficient means for molding the molded articles including the inserts in a single molding process, whereby critical features (e.g., threads) of the inserts are protected during the molding process by a removable plugging material disposed in the critical features of the inserts. Particularly, the critical features of the inserts are temporarily protected during a molding process by the presence of the removable plugging material, whereby once the molding process is completed, the plugging material can be evacuated from the insert to expose the critical features of the insert within the molded article. The use of the systems and methods described herein have been found to improve the quality of molded articles by significantly reducing the level of unwanted molding materials which enter critical features of inserts during the molding process. The use of these systems and methods also improve the speed of production of molded articles, as the removable plugging material can be rapidly evacuated from the insert following molding, and the improved quality of the molded articles results in little if any time being required to clean unwanted molded material from the critical features of the molded articles.

In one aspect, the present disclosure is directed to a method for forming a molded article, where the molded article includes an insert having an engagement feature. During molding of the molded article, a plug comprising a plugging material is temporarily disposed in the receptacle, thereby protecting the engagement feature during the molding process by preventing the material forming the molded article from contacting the engagement feature. In one example, the molded article is a sole structure for an article of footwear, such as a sole plate. The method comprises the steps of disposing a plug including a plugging material within a receptacle of an insert, wherein the receptacle includes an engagement feature; placing the insert including the plugging material into a mold; while in the mold, contacting an exterior surface of the insert with a liquid material; solidifying the liquid material in the mold into a solid material, forming a molded article including the insert partially embedded in the solid material, wherein a surface of the insert remains exposed in the molded article; removing the molded article from the mold, and removing the plugging material from the receptacle of the exposed surface of the partially embedded insert, exposing the engagement feature. Optionally, the method can further comprise the step of disposing the plugging material in the insert. Disposing the plugging material can include inserting a pre-shaped (e.g., pre-molded) plug of plugging material into the receptacle of the insert prior to placing the insert into the mold. Alternatively, the plugging material can be disposed into the receptacle of the insert by subjecting the plugging material and the insert to a plug molding operation. In the plug molding operation, the plugging material is molded while in contact with the engagement feature to cover, fill or otherwise protect the engagement feature of the insert. In some cases, this plug molding operation may include softening or melting the plugging material before or while it is disposed within the receptacle of the insert, or solidifying the plugging material while it is disposed within the receptacle of the insert, or both. For example, the step of disposing the plugging material may include curing or partially curing the plugging material, thereby increasing its durometer. In some examples, the receptacle is an aperture formed through the insert and the engagement feature is a female helical thread. Here, a plug of a malleable plugging material may be formed to have a larger diameter than a minor diameter of the female helical threads, such that the plug is pressed into the threads to seal the receptacle. Optionally, during the molding process, a substrate such as a textile can be included in the mold, and can be contacted by the liquid material. When present, the substrate may be attached to the insert.

Another aspect of the disclosure provides a system for forming a molded article including an insert. The system includes a plate mold having a plate mold cavity. A carcass is disposed within the plate mold cavity of the plate mold and includes a flexible substrate, an insert attached to the flexible substrate and including a receptacle, and a plugging material disposed within the receptacle of the insert. Here, the plugging material has a durometer of less than 100 Shore 00, and more particularly, ranging from 10 Shore A to 60 Shore A. In some examples, the receptacle includes an aperture formed through at least one end of the insert and including an engagement feature. Here, the engagement feature may include female helical threads. In some examples, the plugging material is formed as a plug disposed within the aperture, flush with the at least one end of the insert. Here, the plug may include an alignment feature configured to be interference fit with a fixture of the plate mold.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

With reference to FIGS. 1-11, a method and system for forming an article of footwear 10 having a sole structure 14 including threaded inserts or bushings 18 is provided. Generally, the method includes pressing a moldable plugging material 102 into a threaded receptacle 22 of the insert 18 to effectively plug the receptacle 22. The insert 18 is then molded into the sole structure 14 in a separate molding step, where the plugging material 102 disposed within the receptacle 22 prevents molding materials (e.g., liquids) of the sole structure 14 from flowing into the receptacle 22. After molding of the sole structure 14, the plugging material 102 can be removed from each of the inserts 18 to expose an interior of the receptacle 22. By providing the system and method described below, molded components having inserts with critical features (e.g., threads or mating surfaces) can be more easily formed using conventional molding processes, as liquid molding materials provided during the molding process are prevented from pervading the critical features of the insert 18.

With reference to FIG. 1, an article of footwear 10 includes an upper 12 and a sole structure 14. The upper 12 may be a conventional upper 12 including interior surfaces that define an interior void configured to receive and secure a foot for support on the sole structure 14. The upper 12 may be formed from one or more materials that are stitched or adhesively bonded together to form the interior void. Suitable materials of the upper 12 may include, but are not limited to, a textile including a mesh or a synthetic leather, a foam, and a natural leather. The materials may be selected and located to impart properties of durability, air-permeability, wear-resistance, flexibility, and comfort.

The sole structure 14 is attached to the bottom of the upper 12 and defines a ground-engaging surface of the article of footwear 10. In the illustrated example, the sole structure 14 includes a sole plate 16 having a plurality of inserts 18. As described in greater detail below, the inserts 18 may be embedded or molded into the sole plate 16 using various methods of molding, such as compression molding or injection molding. As shown, the sole plate 16 and the inserts 18 cooperate to define a ground-engaging surface of the article of footwear 10. The sole structure 14 may further include one or more traction elements 20 attached to the sole plate 16. The one or more traction elements 20 may be permanently attached to the sole plate 16, or may be removably attached to the sole plate 16. In the illustrated example, the traction elements 20 are formed as removable traction elements 20 that can be selectively attached to and detached from the sole plate 16. Particularly, the traction elements 20 may be studs 20 configured to interface with the inserts 18 of the sole structure 14, as described in greater detail below.

Figure 2:
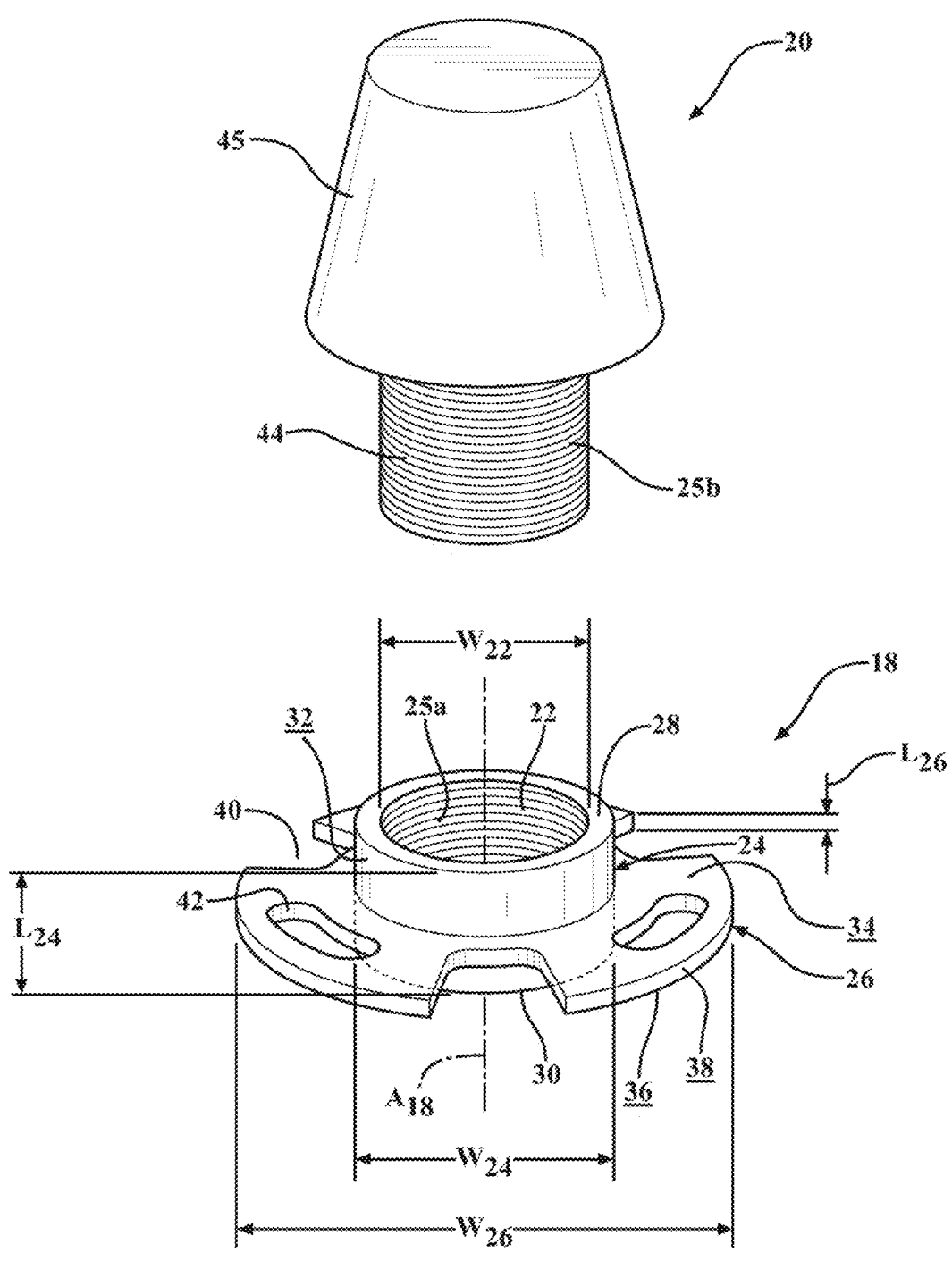
FIG. 2 is an exploded perspective view of an example of an insert and traction element used in forming the sole structure of FIG. 1.

Referring to FIG. 2, examples of an insert 18 and a traction element 20 of the sole structure 14 are shown in greater detail. As shown, the insert 18 includes a receptacle 22 having an aperture extending through at least one end of the insert 18. In the illustrated example, the aperture of the receptacle 22 extends entirely through a length of the insert 18. Here, the receptacle 22 is configured to interface with a corresponding component to secure the component to the insert 18. For instance, in the current example, the receptacle 22 is configured to interface with the traction element 20.

As shown, a first portion of the insert 18 includes a bushing 24 forming the receptacle 22, and a flange 26 projecting laterally outwardly from a periphery of the bushing 24. The bushing 24 extends from a first end 28 to a second end 30 along a longitudinal axis $A_{18}$ of the insert 18. A distance from the first end 28 to the second end 30 defines a length $L_{24}$ of the bushing 24, and in this example, the insert 18. The bushing 24 further includes a peripheral side surface 32 extending between the first end 28 and the second end 30 and defining the outer periphery of the bushing 24. In the illustrated example, the bushing 24 is formed as a cylinder, such that the peripheral side surface 32 of the bushing 24 has a circular (i.e., constant radius) cross section having a first width $W_{24}$. In other examples, the bushing 24 may have a polygonal or irregular cross section.

As illustrated in FIG. 2, the receptacle 22 is formed to include an aperture extending through the length $L_{24}$ of the bushing 24 from the first end 28 to the second end 30. Optionally, the aperture of the receptacle 22 may be formed only in one of the first end 28 or the second end 30, and extend partially through the length $L_{24}$ of the bushing 24 such that the receptacle 22 is a blind bore. As provided above, the receptacle 22 is configured to interface with the traction element 20 to secure the traction element 20 to the sole structure 14. For instance, the receptacle 22 may include first engagement features 25a configured to interface with a second engagement feature 25b formed on the traction element 20. In the illustrated example, the receptacle 22 includes first engagement features 25a in the form of female helical threads, while the traction element 20 includes corresponding male helical threads 25b formed on a shaft 44 of the traction element 20. In other examples, the first engagement features 25a may include detents or keyways configured to interface with corresponding features of the traction element 20. As shown, a minor diameter of the female helical threads 25a of the receptacle 22 define an interior diameter or width $W_{22}$ of the receptacle 22.

As provided above, the flange 26 projects laterally outwardly (i.e., perpendicular to the longitudinal axis $A_{18}$) from the peripheral side surface 32 of the bushing 24 to provide a portion of the insert 18 with a pronounced width $W_{26}$. As shown, the flange 26 includes a top surface 34 and a bottom surface 36 formed on an opposite side of the flange 26 from the top surface 34. A distance between the top surface 34 and the bottom surface 36 defines a thickness or length $L_{26}$ of the flange 26, which is less than the length $L_{24}$ of the bushing 24. In the illustrated example, each of the top surface 34 and the bottom surface 36 are offset or spaced apart from the ends 28, 30 of the bushing 24 along the direction of the longitudinal axis $A_{18}$ by a respective distance. In some instances, as shown, each of the surfaces 34, 36 may be equally offset from the respective end 28, 30 of the bushing 24. However, in other examples, the surfaces 34, 36 may be offset by different distances, or one of the surfaces 34, 36 may be flush with the respective end 28, 30 of the bushing 24. A peripheral side surface 38 of the flange 26 extends from the top surface 34 to the bottom surface 36 and defines an outer peripheral profile of the flange 26. In the illustrated example, the flange 26 is formed as a cylindrical flange, such that the peripheral side surface 38 of the flange 26 has a circular (i.e., constant radius) cross section defining the width $W_{26}$.

In some examples, the flange 26 includes one or more attachment features 40, 42 configured for securing the insert 18 relative to components of the sole plate 16. For instance, the illustrated flange 26 includes a series of recesses 40 radially spaced about the circumference of the peripheral side surface 38 and a series of apertures 42 extending through the thickness of the flange 26 from the top surface 34 to the bottom surface 36. As described in greater detail below, when the sole structure 14 is formed, the materials of the sole plate 16 may interface with the attachment features 40, 42 to prevent relative movement between the insert 18 and the components of the sole plate 16. For example, the recesses 40 are configured to engage a resin or molding material of the sole plate 16 to secure a position of the insert 18 relative to the sole plate 16 when the sole structure 14 is molded. The apertures 42 are configured for receiving a stitching for attaching the insert 18 to a substrate, such as a textile, prior to molding the sole plate 16. In other examples, the attachment features may be realized as projections extending from any of the surfaces 34, 36, 38.

Referring still to FIG. 2, the traction element 20 generally includes the shaft 44 having the second engagement features 25b, and a stud or cleat 45 attached to the shaft 44. As provided above, the shaft 44 including the second engagement features 25b is configured to interface with the receptacle 22 including the first engagement features 25a to selectively secure the traction element 20 to the sole structure 14. Accordingly, it is important that the first engagement features 25a of the receptacle 22 be free of debris that may impede full engagement between the first engagement features 25a and the second engagement features 25b.

Turning now to FIGS. 3-11, a method and system 100 for forming the sole structure 14 described above is illustrated.

Generally, the system 100 and method provide a means for temporarily plugging the receptacles 22 of the inserts 18 with a material 102 during molding of the sole structure 14 to prevent the materials used in forming the sole plate 16 from contaminating the engagement features 25*a* of the receptacle 22. After formation of the sole structure 14, the material 102 can be removed from the receptacles 22 to expose the first engagement features 25*a*.

Figure 3:
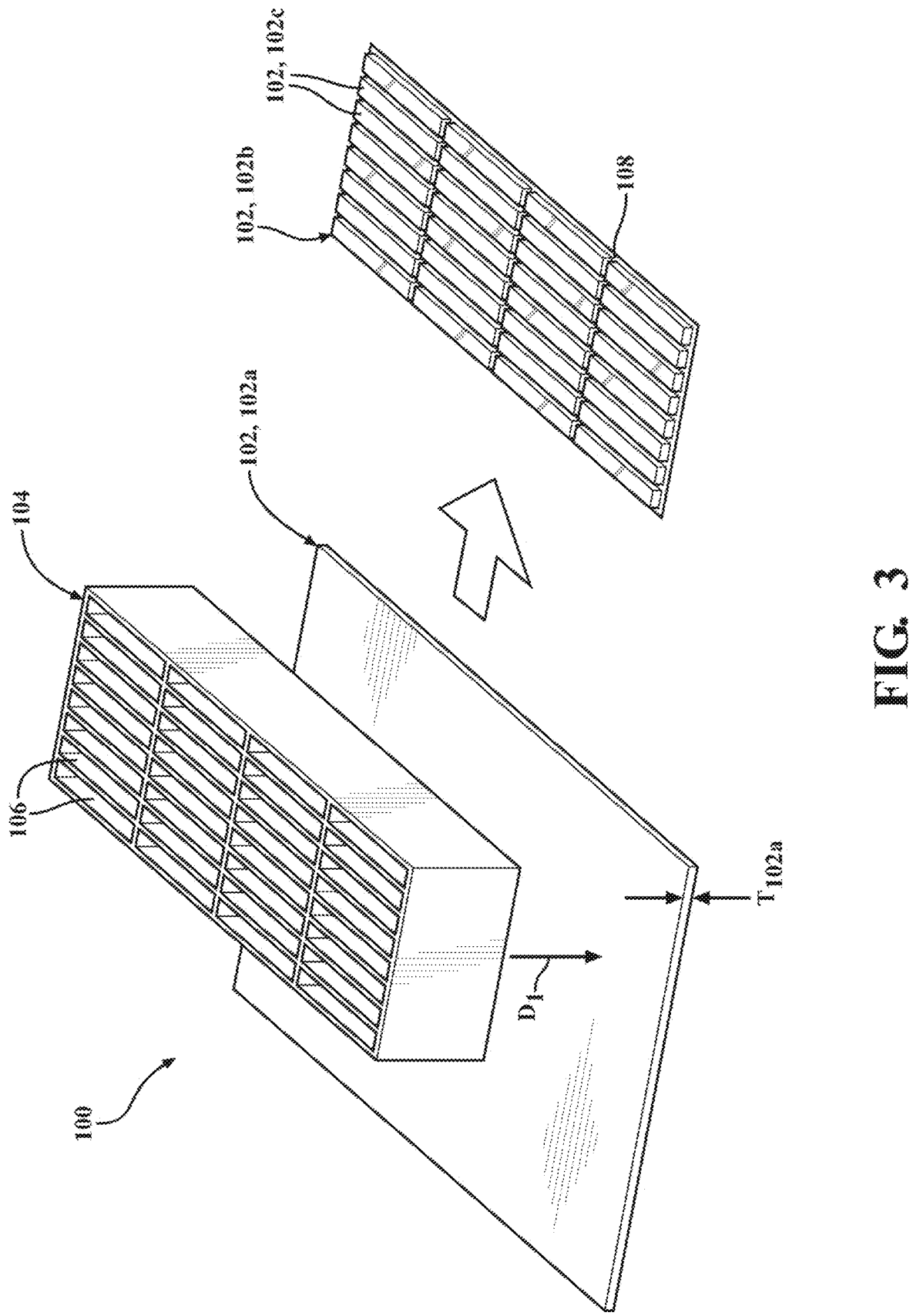
FIG. 3 is a partial environmental view of a system and method according to the principles of the present disclosure, showing the formation of a plugging material into a plurality of blanks.

With reference to FIG. 3, the system 100 is provided with a plugging material 102 operable to be shaped and molded to temporarily plug the receptacle 22 of the insert 18. The plugging material 102 may include elastomers having a relatively low durometer. For example, materials having a durometer less than 100 Shore 00, and more particularly, materials having a durometer ranging from 10 Shore A to 60 Shore A may be used. The plugging material 102 may include a thermoset material, a thermosettable material (i.e., a material which is initially thermoplastic but becomes thermoset following curing), or a thermoplastic material that has the desired hardness when solidified. In one example, the plugging material 102 is a thermosettable material that can be cured under the application of heat. The plugging material 102 may include natural rubber or synthetic rubber (e.g., gum or green rubbers), such as styrene-butadiene rubber, isoprene rubber, silicone rubber, or combinations thereof.

Referring still to FIG. 3, a sheet 102*a* of the plugging material 102 is provided to the system 100 in a malleable state, and has a substantially constant thickness $T_{102a}$. As shown, the system 100 also includes a die 104 configured for forming the sheet 102*a* into a preform 102*b* having a plurality of blanks 102*c* of the plugging material 102. Here, the die 104 includes a plurality of die cavities 106 corresponding to a desired shape of the plugging material blanks 102*c*. For example, the die cavities 106 of the illustrated example have a rectangular profile for forming rectangular blanks 102*c*. In one step, the die 104 is pressed at least partially through the thickness $T_{102a}$ of the sheet 102*a* (as indicated by arrow Di) such that the profiles of the die cavities 106 are imparted to the sheet 102*a* to form the preform 102*b* having the plurality of the blanks 102*c*.

In the illustrated example, the die 104 is pressed only partially through the thickness $T_{102a}$ of the sheet 102*a*, such that a web area 108 is formed between adjacent ones of the blanks 102*c*. The web area 108 has a thickness less than the initial thickness $T_{102a}$ of the sheet 102*a* and the blanks 102*c* to provide the preform 102*b* with a series of tear seams along which individual ones of the blanks 102*c* may be removed from the preform 102*b*. Optionally, the web area 108 may be perforated to aid in tearing or removal of the blanks 102*c*.

Figure 4:
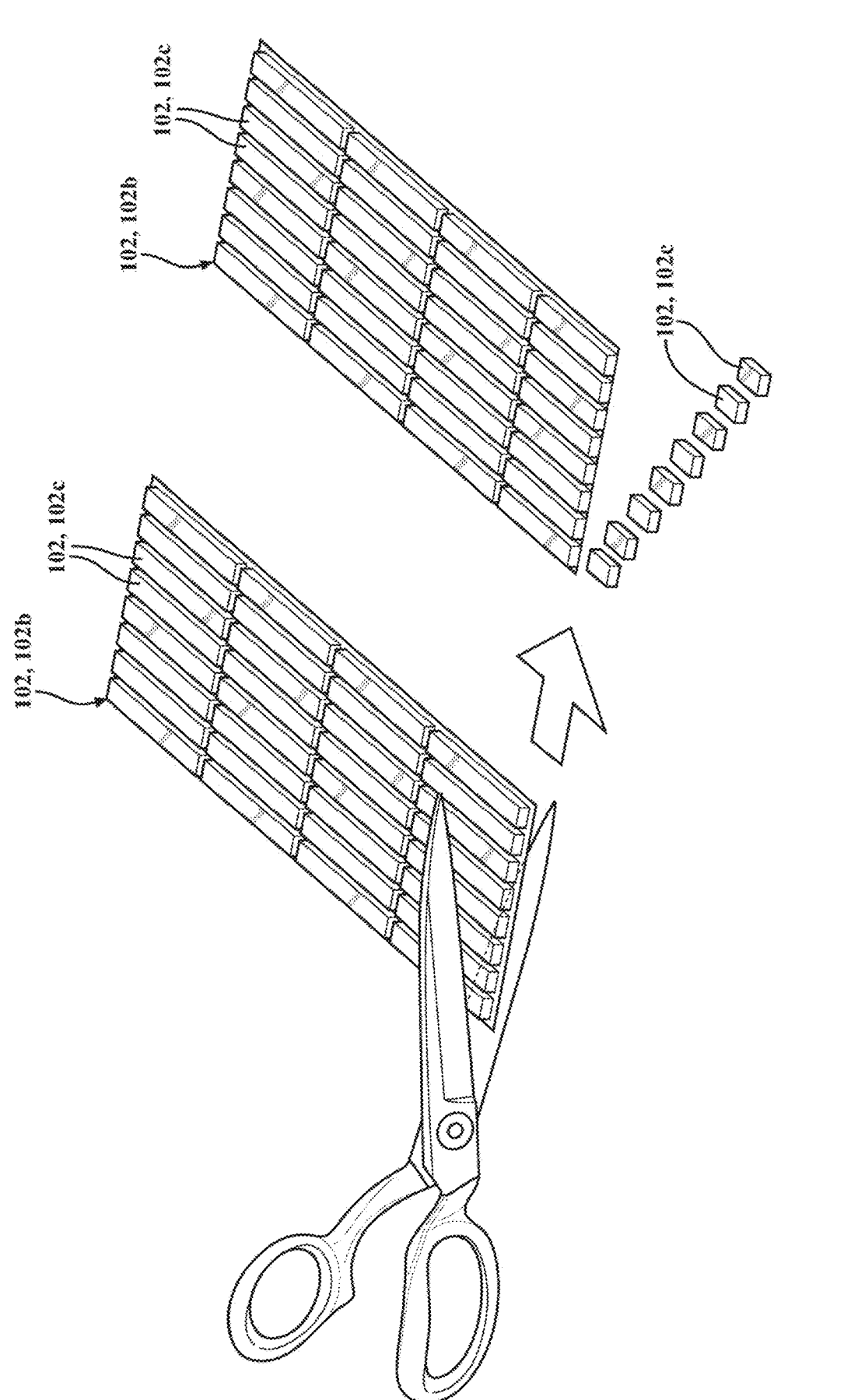
FIG. 4 is a partial environmental view of the system and molded article of the present disclosure, showing the trimming of the blanks of FIG. 3.

Referring now to FIG. 4, the blanks 102*c* may be trimmed such that the first material 102 is appropriately sized for insertion within the receptacles 22. Particularly, a volume of each blank 102*c* may be trimmed to be greater than a volume of the receptacle 22, such that when the plugging material 102 is inserted within the receptacles 22, the receptacles 22 will be filled with the plugging material 102 to cover the engagement features 25*a*, as described in greater detail below. In the illustrated example, the blanks 102*c* are sized by trimming the blanks 102*c* of the preform 102*b* using a cutting tool (e.g., scissors). However, in other examples, the blanks 102*c* may be initially formed at the desired volume by the die 104, whereby individual ones of the blanks 102*c* can be removed from the preform 102*b* without additional trimming.

Figure 5:
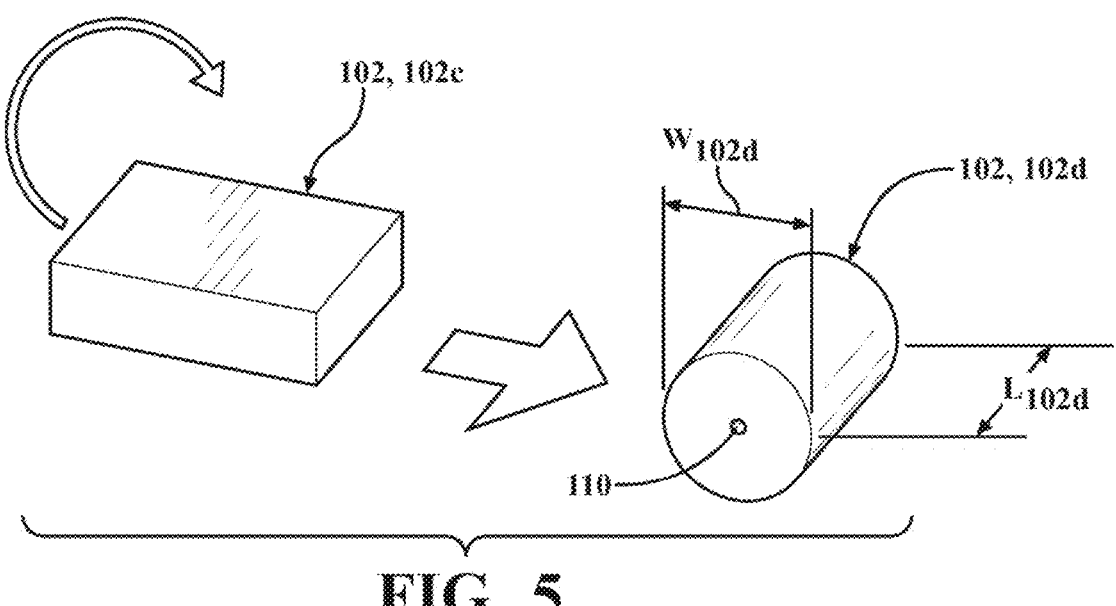
FIG. 5 is a partial environmental view of the system and molded article of the present disclosure, showing the formation of one of the blanks of FIG. 4 into a plug.

At FIG. 5, the blanks 102*c* of the plugging material 102 are formed into plugs 102*d* configured to be inserted into the receptacles 22 of the inserts 18. Generally, each of the plugs 102*d* is sized to fill the receptacle 22 such that each of the first engagement features 25*a* is masked or covered by the plugging material 102. As shown, each plug 102*d* may be formed as a substantially cylindrical body having a length $L_{102d}$ and a diameter or width $W_{102d}$. Here, the length $L_{102d}$ and the width $W_{102d}$ of the plug 102*d* are both greater than the length $L_{24}$ and the width $W_{22}$ of the receptacle 22, respectively. Particularly, the width $W_{102d}$ of the plug 102*d*, formed by the outside diameter of the plug 102*d*, is greater than the minor diameter of the female helical threads forming the first engagement feature 25*a*, such that the plugging material 102 will at least partially extend into the female helical threads when the plug 102*d* is disposed within the receptacle 22. For example, the width $W_{102d}$ (i.e., outside diameter) of the plug 102*d* may be 10% to 25% greater than the width $W_{22}$ (i.e., minor diameter) of the receptacle 22 (e.g., 5 mm diameter plug in 4.5 mm diameter receptacle).

Optionally, the plug 102*d* may be formed with a first guide hole 110 configured to align the insert 18 during a molding step, as described in greater detail below. In the illustrated example, the first guide hole 110 is an aperture 110 extending along the length $L_{102d}$ of the plug 102*d*. Here, the aperture 110 is defined as a result of the blank 102*c* being rolled into the shape of the plug 102*d*, whereby an inner surface of the blank 102*c* forms the aperture 110. However, the aperture 110 may be formed by a separate operation, such as by piercing the plug 102*d* using a punch. A size (e.g., diameter) of a cross section of the aperture 110 is selected to provide a slight interference fit between the plug 102*d* and a corresponding feature of an insert mold 112, as discussed below.

While the previous steps provide a method for forming the plugs 102*d* from a sheet 102*a* of the plugging material 102, in other examples the plugs 102*d* may be formed from other types of material stock. For example, the plugging material 102 may be provided as rod stock already having the desired diameter $W_{102d}$ of the plugs 102*d*, whereby desired lengths $L_{102d}$ of individual ones of the plugs 102*d* can be cut from the rod stock. Accordingly, where the illustrated example of the plug 102*d* shows a seam and the aperture 110 resulting from forming the plug 102*d* from one of the blanks 102*c*, in other examples the plug 102*d* may be a solid body corresponding in shape to the receptacle 22. In such examples, the aperture 110 may be provided along the length of the rod stock or subsequently formed in the plugs 102*d* after being cut into the desired length $L_{102d}$.

Figure 6A:
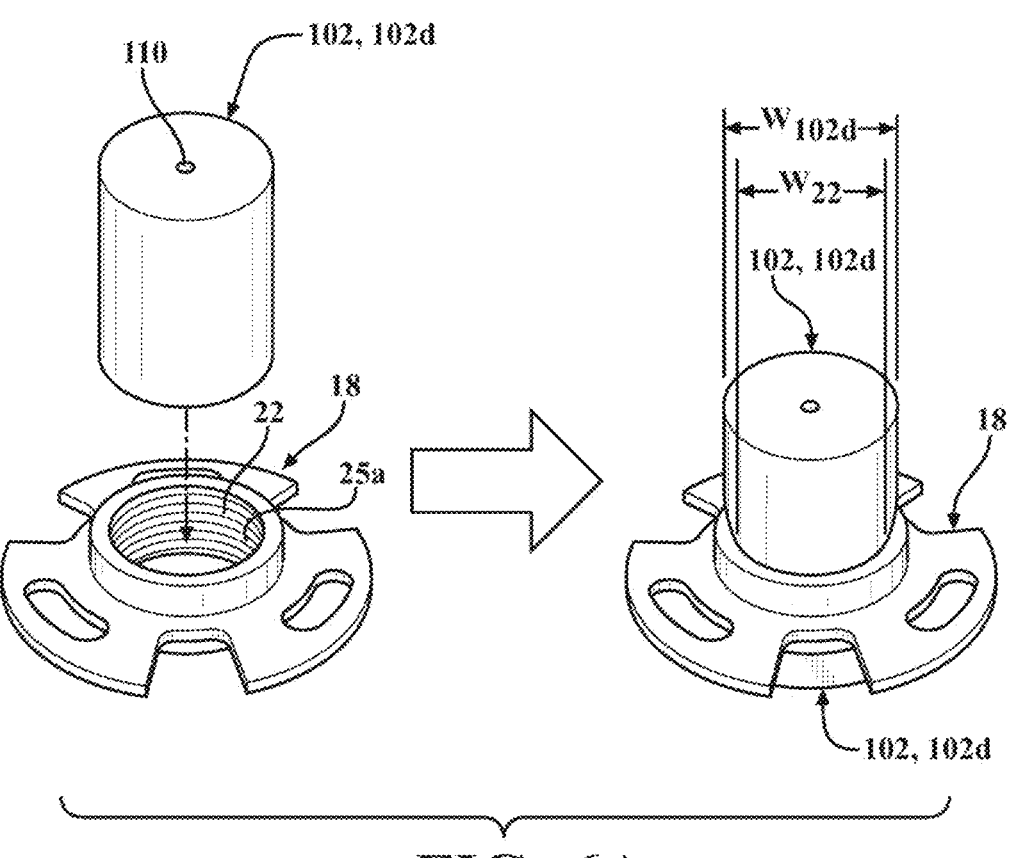
FIG. 6A is a partial environmental view of the system and molded article of the present disclosure, showing the insertion of one of the plugs of FIG. 5 into an insert.
Figure 6B:
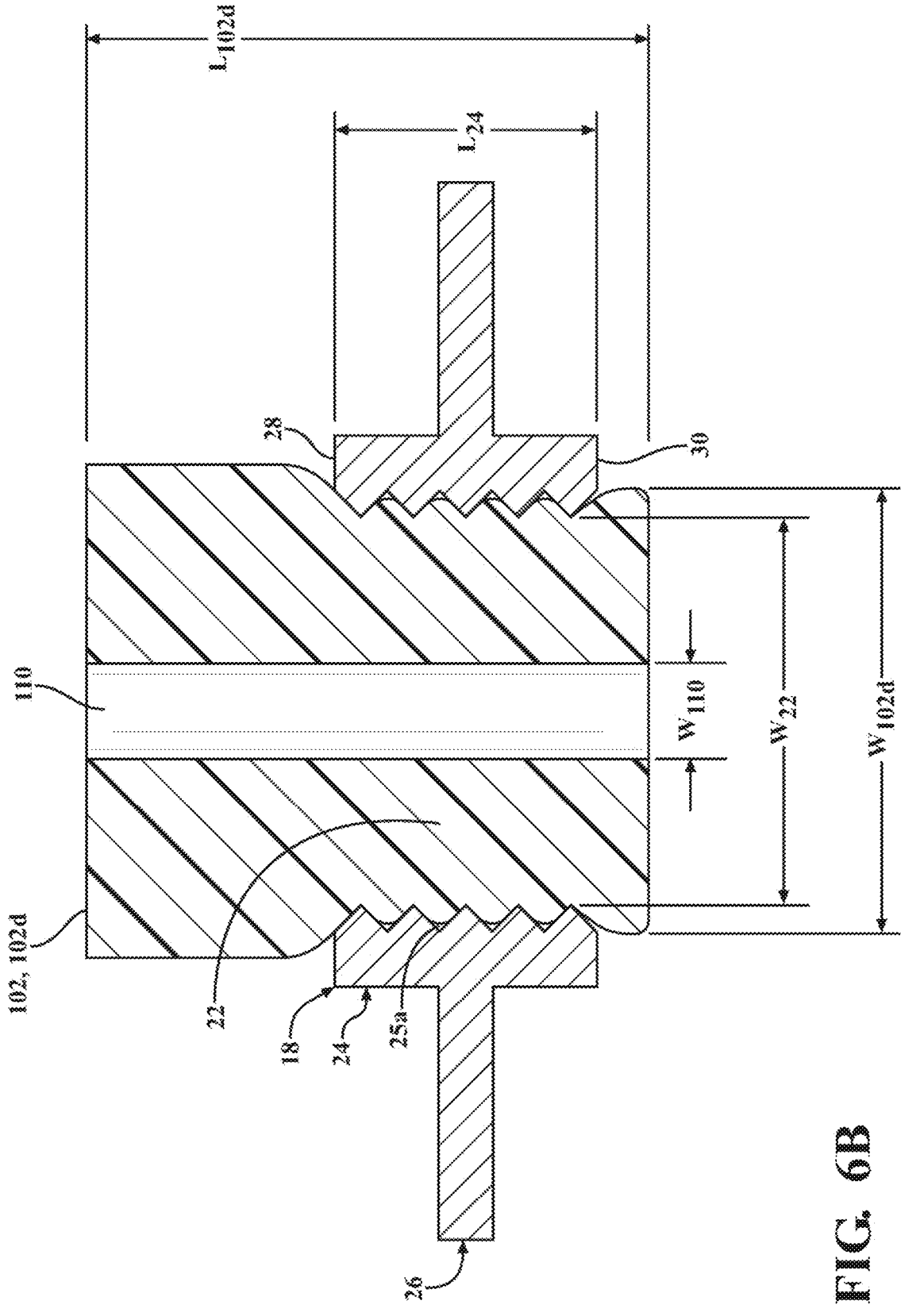
FIG. 6B is a cross-sectional view of the insert and plug of FIG. 6A.

Referring now to FIGS. 6A and 6B, the plug 102*d* is illustrated as being inserted into the receptacle 22 of the insert 18. In the illustrated example, the plugging material 102 is provided in a malleable state and can be pressed through the threads 25*a* and into the receptacle 22. Here, as the plugging material 102 is passed over the threads 25*a*, the larger diameter $W_{102d}$ of the plug 102*d* will cause the plugging material 102 to conform to the profile of the female threads 25*a*, thereby partially filling the threads 25*a*, as best shown in FIG. 6B. As provided above, the length $L_{102d}$ and width $W_{102d}$ of the plug 102*d* are greater than the length $L_{24}$ and width $W_{22}$ of the receptacle 22, such that a portion of the plug 102*d* protrudes from each end 28, 30 of the bushing 24.

Figure 7:
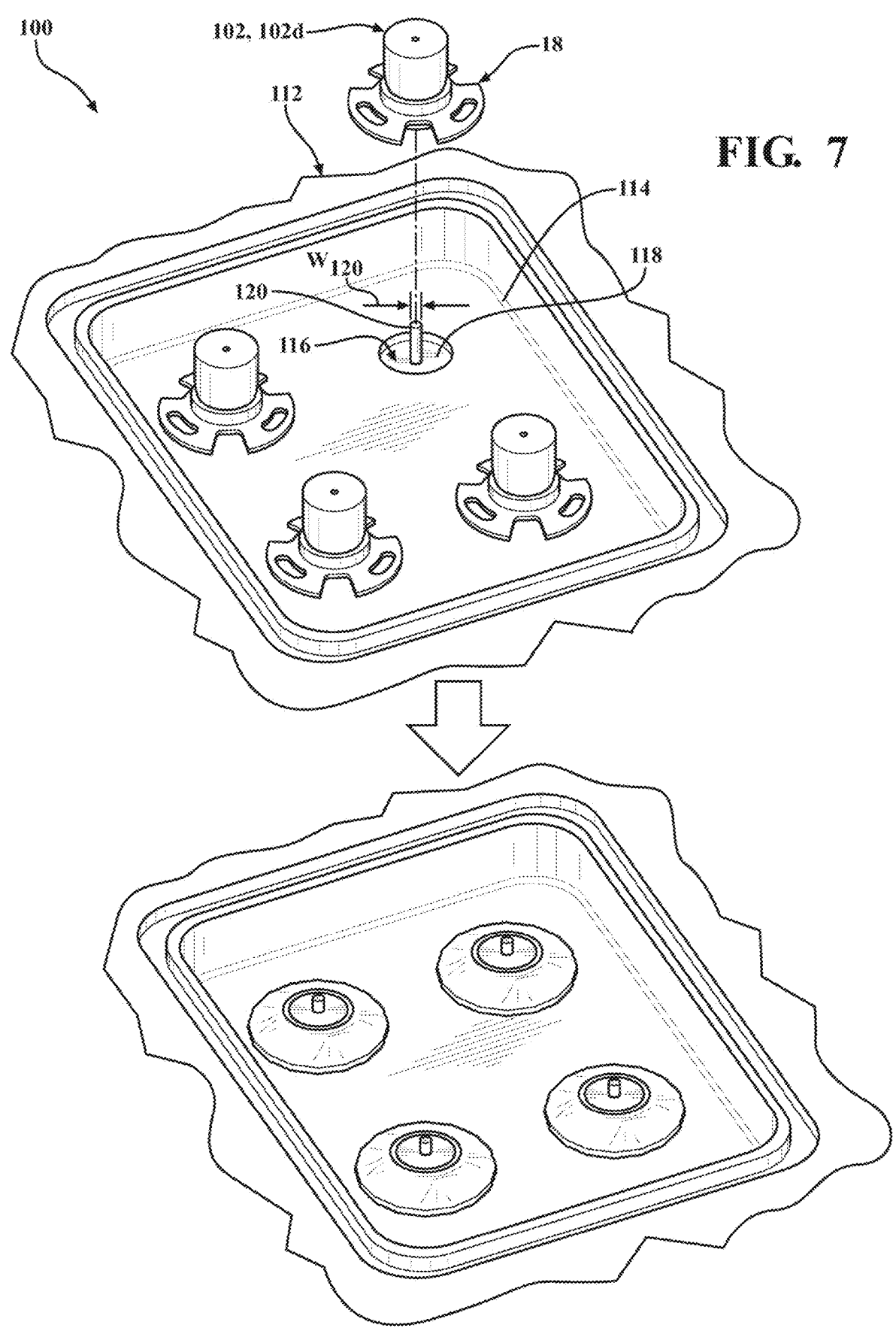
FIG. 7 is a partial environmental view of the system and molded article of the present disclosure, showing placement of the insert and plug of FIG. 6A within a mold.

Referring to FIG. 7, the system 100 further includes an insert mold 112 configured for forming and curing the plugging material 102 within the receptacle 22. For example, with the plug 102*d* inserted in the receptacle 22 of the insert 18, the insert 18 is positioned within the insert mold 112. As shown, the insert mold 112 includes a mold cavity 114 having one or more sockets 116 for receiving the inserts 18 and the plugs 102*d*. Each socket 116 includes a recess 118 for receiving and aligning a position of the insert 18 within the mold cavity 114. The recess 118 has a cross-sectional shape corresponding to the profile of the peripheral side surface 32 of the bushing 24, whereby the bushing 24 can be at least partially inserted within the recess 118 to position the insert 18 and plug 102*d* in the mold cavity 114.

Each socket 116 may include a pin 120 extending from the recess 118 and configured to be inserted at least partially through the plug 102*d* to form a guide hole (FIG. 8) at least partially through the length $L_{102d}$ of the plug 102*d*. In the illustrated example, the pin 120 has a width $W_{120}$ that is greater than a width $W_{110}$ of the aperture 110 (FIG. 6B), such that when the insert 18 and plug 102*d* are placed at the socket 116, the pin 120 is press fit within the aperture 110 to secure a position of the insert 18 and plug 102*d*. However, in other examples where the plug 102*d* is provided without the aperture 110, the pin 120 may be configured to pierce the plug 102*d*.

With the insert 18 and plug 102*d* positioned in the mold cavity 114, the insert mold 112 is closed and the insert 18 and plug 102*d* are subjected to heat and pressure to mold the plug 102*d* within the receptacle 22. Optionally, this molding process may fully or partially cure the plugging material 102. In one example, when the plugging material 102 is a silicone material, the inserts 18 and plugs 102*d* may be pressed for approximately five minutes at a temperature of approximately 170 degrees Celsius in order to mold and at least partially cure the silicone material, increasing its durometer. During the pressing operation, the plugging material 102 is pressed into the female threads 25*a* of the receptacle 22 to fully seal the threads. Further, the size and shape of the pin 120 will be imparted to the cured plug 102*d* such that when the insert 18 is removed from the insert mold 112, the plug 102*d* will retain the shape of the alignment feature 122 formed at least partially therethrough and having a width $W_{122}$ similar to the width $W_{120}$ of the pin 120, as shown in FIG. 8.

Figure 8:
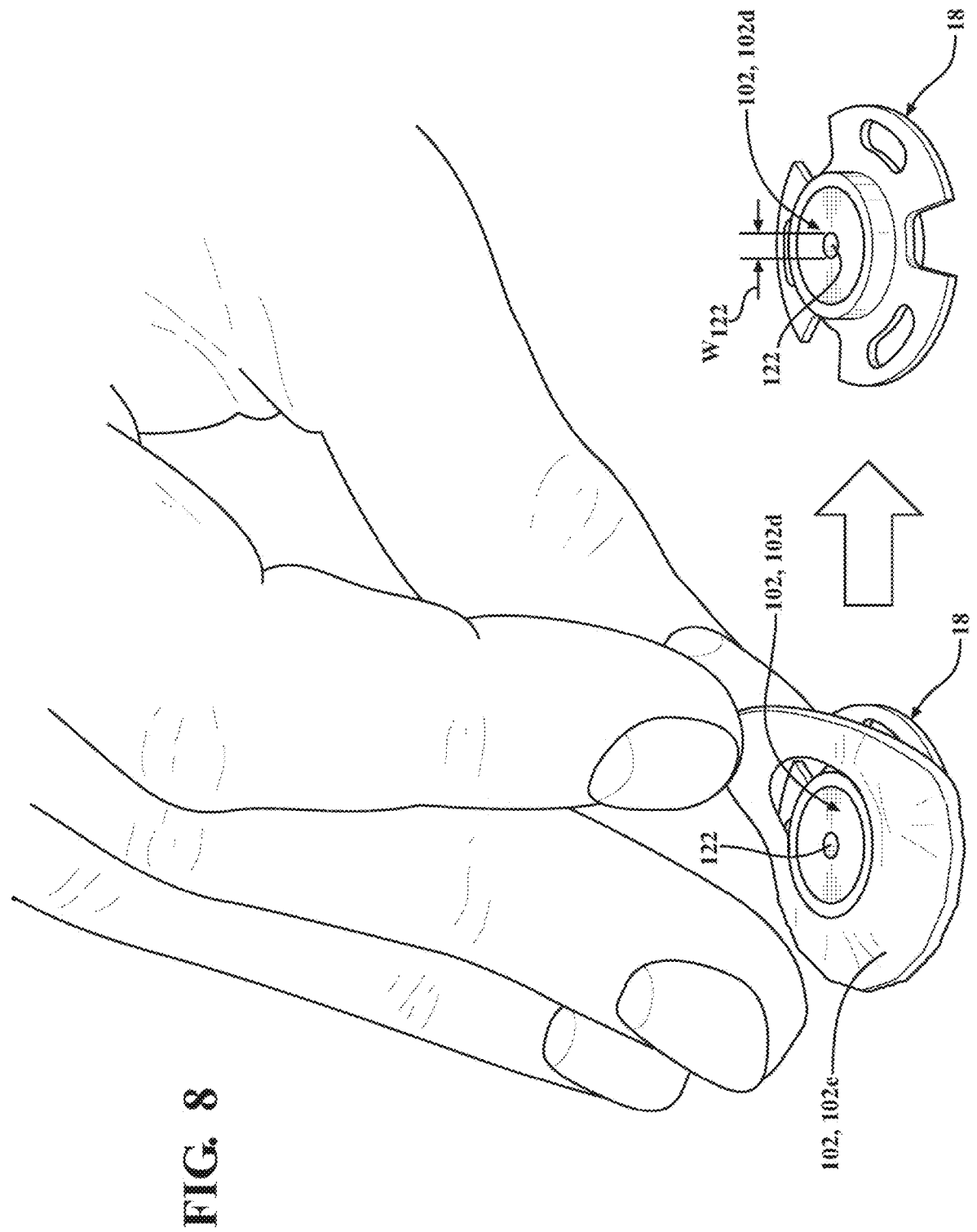
FIG. 8 is a partial environmental view of the system and molded article of the present disclosure, showing removal of flashing from the insert and plug.

Referring now to FIG. 8, during the molding process, excess plugging material 102 may form flashing 102*e* around the bushing 24 of the insert 18. Accordingly, FIG. 8 illustrates another step where the flashing 102*e* is separated from the molded plug 102*d*, leaving only the molded plug 102*d* and the insert 18. As shown, once the flashing 102*e* is removed, the molded plug 102*d* is flush with each of the first end 28 and the second end 30 of the bushing 24 such that all of the threads 25*a* of the receptacle 22 are covered by the plugging material 102. Optionally, when the plugging material 102 is a thermosettable material and has not already been cured in previous steps, once all of the threads 25*a* of the receptacle 22 have been covered by the plugging material 102, the plugging material 102 can be cured.

Figure 9:
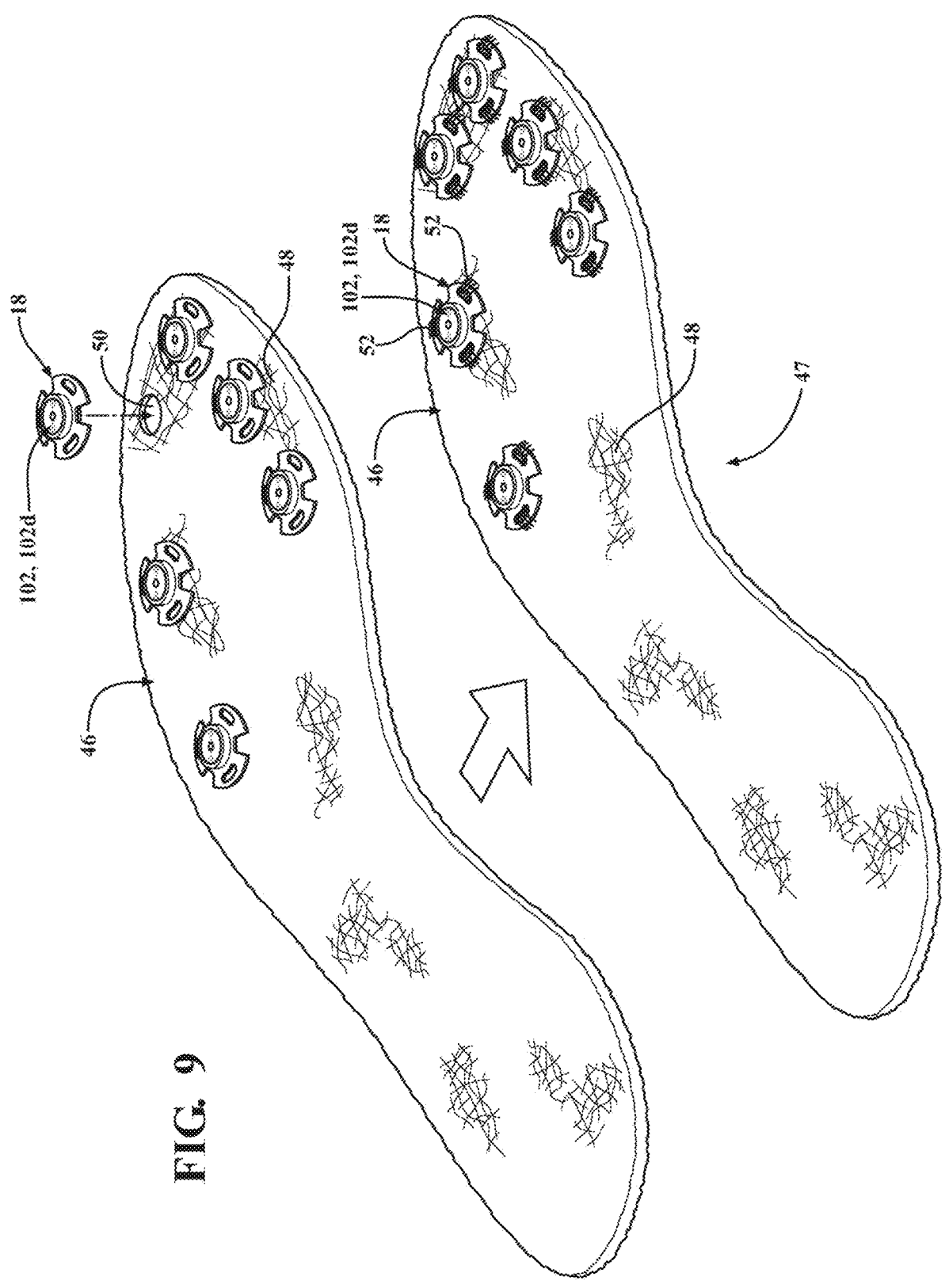
FIG. 9 is a partial environmental view of the system and molded article of the present disclosure, showing attachment of the insert and plug to a substrate.

At FIG. 9, one or more of the inserts 18 are attached to a substrate 46 for forming the sole plate 16. Collectively, the substrate 46, the attached inserts 18, and the plugs 102*d* may be referred to as a carcass 47 of the sole plate 16, which includes the physical components of the sole plate 16 prior to the provision of a molding material 54 (e.g., resin). The substrate 46 may be a fabric or fibrous material configured for use in forming composites. For example, the substrate 46 may be a unidirectional tape or a multi-axial fabric having a series of fibers 48 that are impregnated with resin. The substrate 46 may include at least one of carbon fibers, aramid fibers, boron fibers, glass fibers, and other polymer fibers that form the unidirectional sheet or multi-axial fabric. Fibers 48 such as carbon fibers, aramid fibers, and boron fibers may provide a high Young's modulus while glass fibers (e.g., fiberglass) and other polymer fibers (e.g., synthetic fibers such as polyamides other than aramid, polyesters, and polyolefins) provide a medium modulus. Additionally or alternatively, the substrate 46 may include a unidirectional tape. Further, the substrate may include multiple sheets, where one or more of the sheets includes fibers formed from the same material or, alternatively, one or more of the sheets includes fibers 48 formed from a different material than the fibers 48 of the other sheets.

As shown, the substrate 46 includes one or more openings 50 for receiving a portion of a respective one of the inserts 18. The openings 50 may be formed in the substrate 46 by a punching or cutting process. In some examples, the openings 50 may be sized for receiving one end 28, 30 of the bushing 24 therethrough, such that a surface 34, 36 of the flange 26 of the insert 18 faces and abuts a face of the substrate 46 surrounding the opening 50. Accordingly, a width of each opening 50 may be larger than width $W_{24}$ of the bushing 24, but smaller than the width $W_{26}$ of the flange 26. As shown in FIG. 9, the inserts 18 may be attached to the substrate with stitching 52. For example, the insert 18 may be attached by stitching through the apertures 42 formed in the flange 26.

Figure 10:
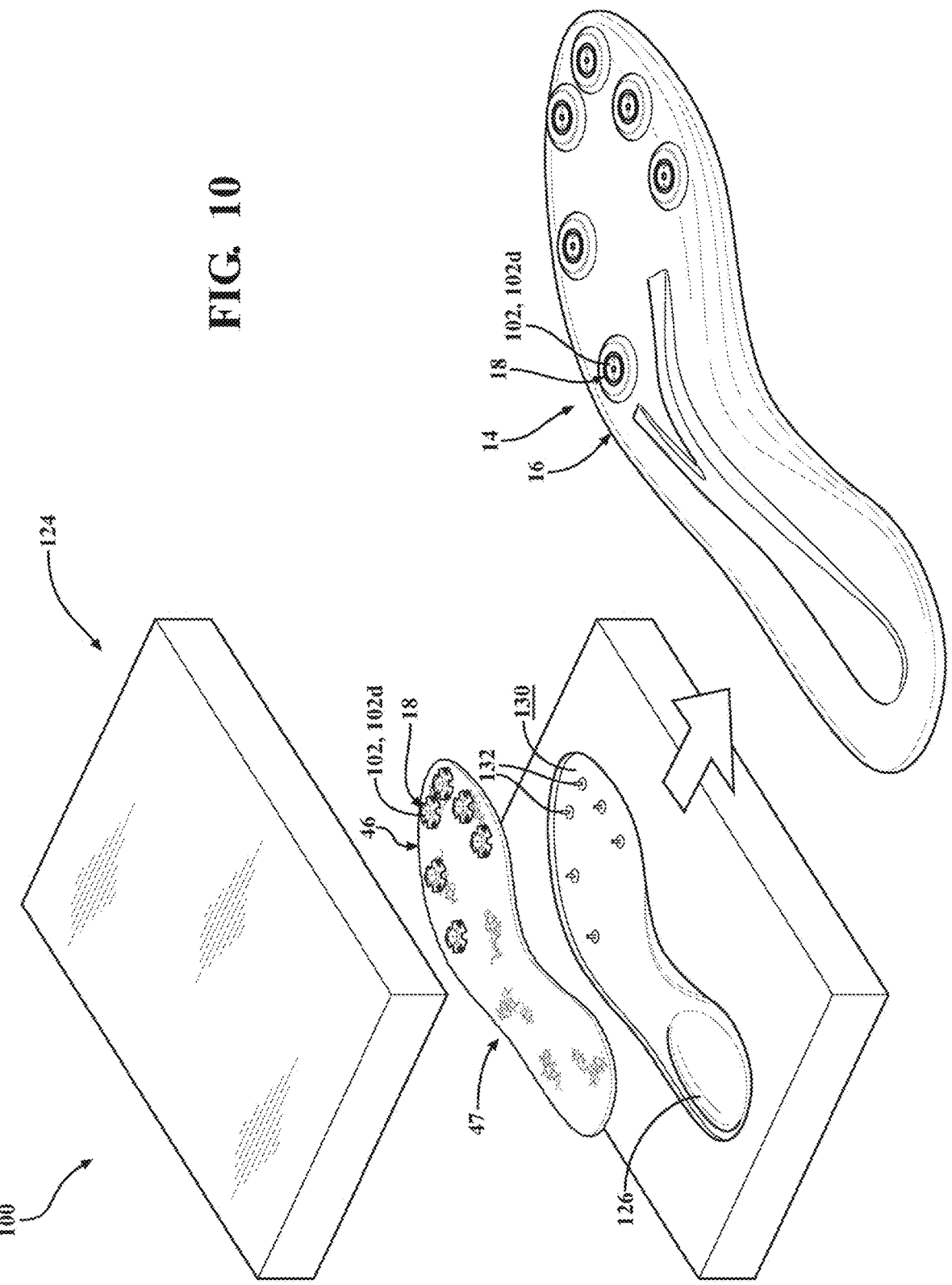
FIG. 10 is a partial environmental view of the system and molded article of the present disclosure, showing formation of a sole plate including the substrate, insert, and plug of FIG. 9.
Figures 11A, 11B:
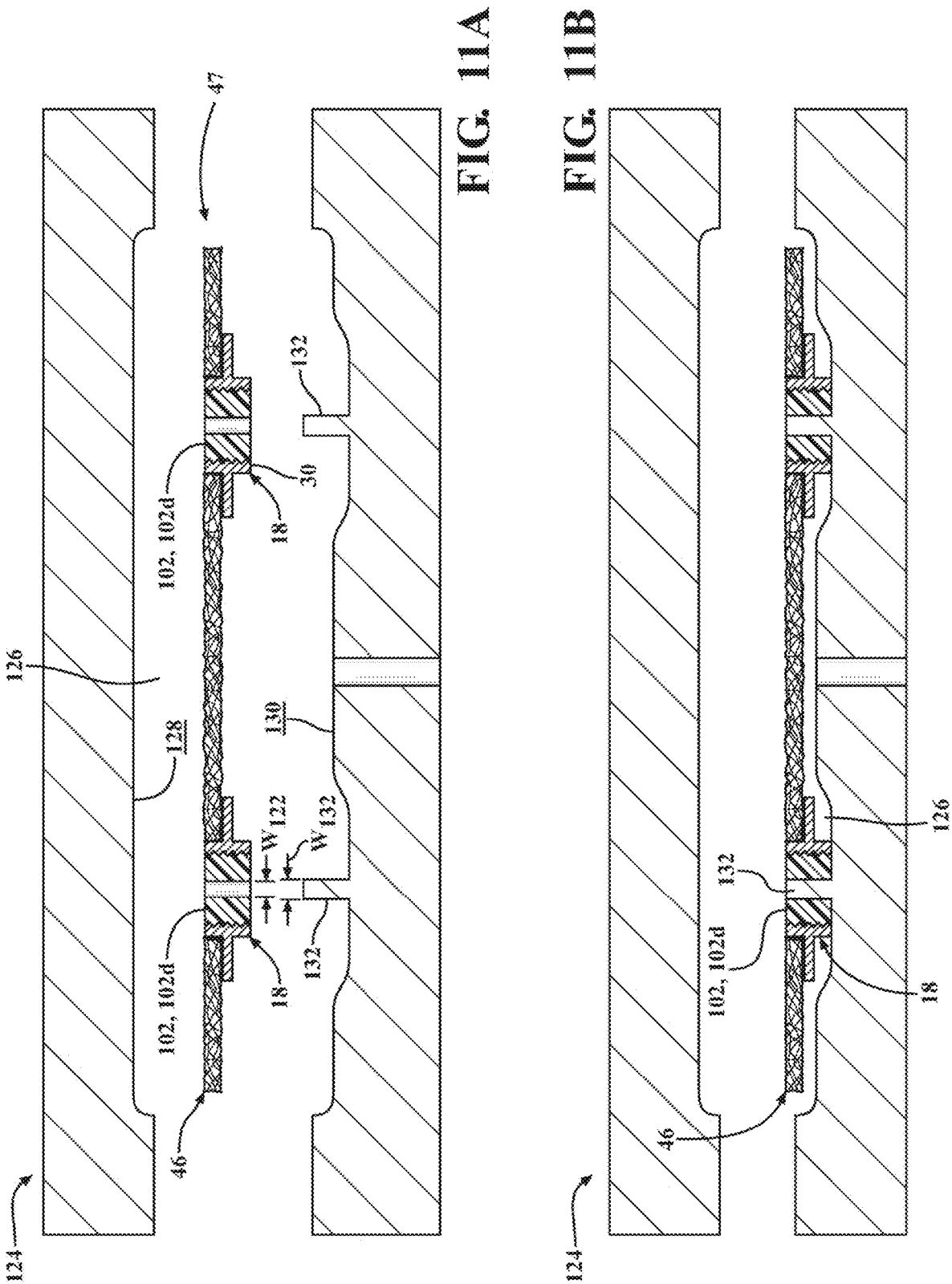
FIGS. 11A-11C are cross-sectional views of a mold according to the principles of the present disclosure, showing steps for forming the sole plate of FIG. 10.
Figures 11C, 12:
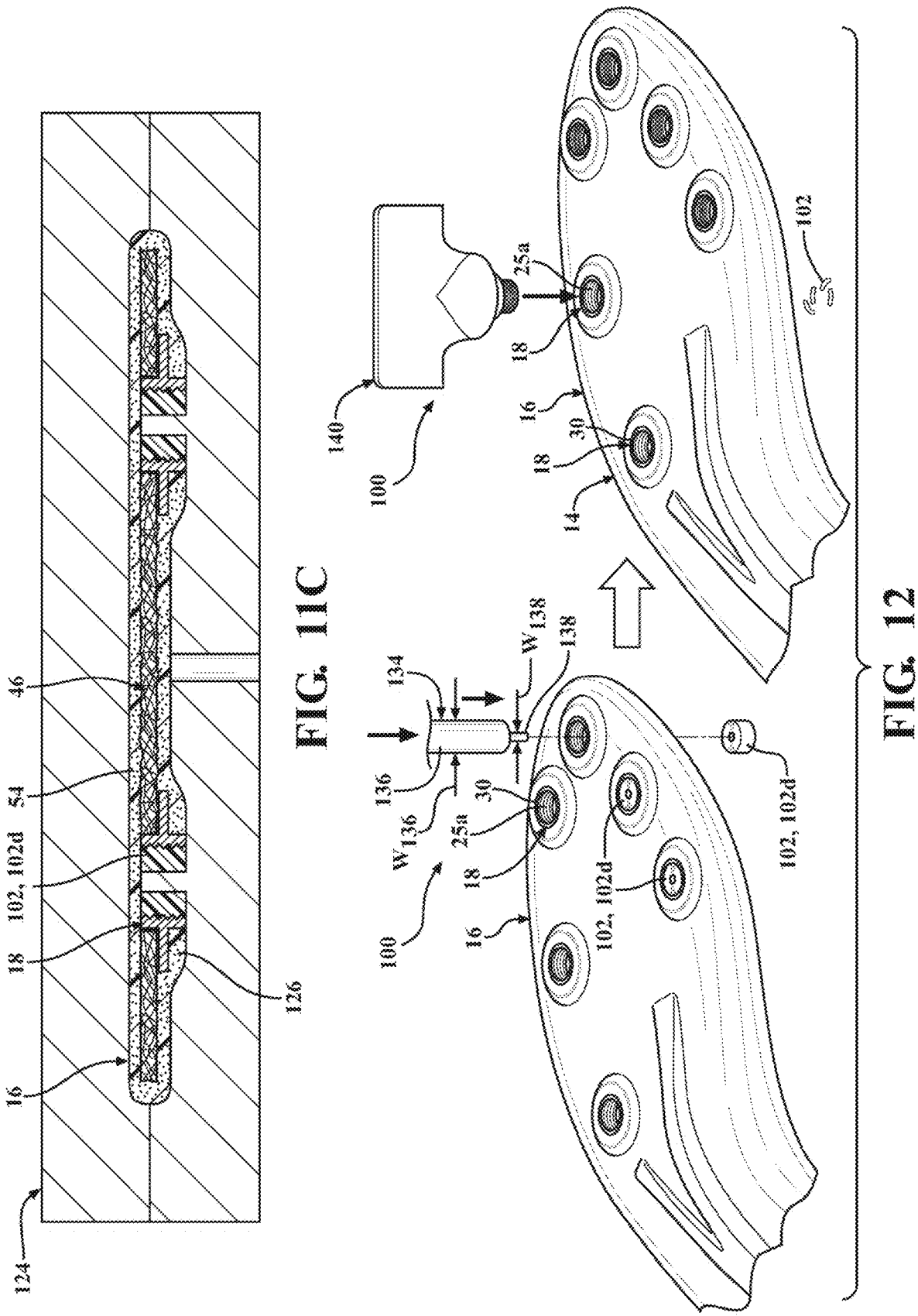
FIG. 12 is a partial environmental view of the system and molded article of the present disclosure, showing removal of the plugging material from the sole plate.

Referring now to FIGS. 10-11C, the system 100 may include a plate mold 124 for forming the sole plate 16. As shown in FIG. 11A, the plate mold 124 includes a mold cavity 126 defined by an upper mold surface 128 and a lower mold surface 130. The mold cavity 126 is configured to receive and enclose the carcass 47 therein. One or both of the mold surfaces 128, 130 may include contours or features configured to receive the substrate 46 and the inserts 18 and to impart a desired profile to the molded sole plate 16.

As shown, the plate mold 124 may include one or more fixtures 132 positioned within the mold cavity 126, which are configured to position each of the inserts 18 in a desired arrangement. In the illustrated example, the fixtures 132 are embodied as pins 132 extending from the lower mold surface 130. Here, the pins 132 are provided as cylindrical bodies having a diameter or width $W_{132}$ defined by an outer peripheral sidewall. The width $W_{132}$ of the cross section of each pin 132 is selected to be greater than the width $W_{122}$ of the cross section of the alignment feature 122 formed in the plug 102*d*, such that the pin 132 will provide an interference fit with the alignment feature 122 when the insert 18 and plug 102*d* are pressed onto the pin 132, as shown in FIG. 11B. For example, the width $W_{132}$ (i.e., outside diameter) of the pin 132 may be 10% to 50% greater than the width $W_{122}$ (i.e., diameter) of the alignment feature 122 (e.g., 2 mm diameter pin in 1.5 mm diameter alignment feature). By providing an interference fit between the pins 132 and the plugs 102*d*, the positions of the inserts 18 within the mold cavity 126 are maintained during the molding process, thereby providing consistent positioning of the inserts 18 within the finished sole plates 16.

As best shown in FIG. 11B, when the substrate 46 and the insert 18 are positioned within the plate mold 124 and engaged with the fixtures 132, at least one of the ends 28, 30 of one or more of the inserts 18 may be protected to prevent the molding material 54 from covering the end 28, 30. For example, in the illustrated example, the second ends 30 of each of the inserts 18 are seated against the lower mold surface 130 to form a seal around the second ends 30 of the inserts 18. Thus, when the molding material 54 is provided to the mold cavity 126, the second ends 30 of the inserts 18 will be masked by the lower mold surface 130 such that when the molded sole structure 14 is removed from the mold 124 (FIG. 12), the second ends 30 of the inserts 18 will be exposed through the bottom surface of the sole structure 14. In other examples, the first end 28 of each insert 18 may additionally or alternatively be masked by the upper mold surface 128 during the molding process.

Referring to FIG. 11C, with the substrate 46 and the inserts 18 positioned and secured within the mold cavity 126, the mold 124 is moved to the closed position to seal the mold cavity 126, and a molding material 54 is provided to the mold cavity 126. In some examples, the molding material 54 is a liquid molding material 54 that can be cured by the application of heat and/or pressure. The molding material 54 may include a molten thermoplastic and/or liquid, curable thermoset materials. For example, the molding material 54 may include at least one of an epoxy, a polyurethane, a polymerizable composition, a pre-polymer, or a combination thereof.

As the molding material 54 is injected into the mold cavity 126, the high pressure of the molding material 54 causes the molding material 54 to fill the mold cavity 126 and impregnate the fibers 48 of the substrate 46. However, by providing the insert 18 with the plug 102d in sealing contact with the engagement features 25a of the receptacle 22, the molding material 54 is prevented from flowing into the receptacle 22. Furthermore, the sealed interface between the pin 132 of the plate mold 124 and the alignment feature 122 prevents the molding material 54 from flowing into the alignment feature 122. The molding material 54 is then cured in the mold cavity 126 at a predetermined temperature and pressure to form the sole structure 14 including the sole plate 16 and the inserts 18.

Turning now to FIG. 12, once the molding material 54 of the sole plate 16 is cured, the sole structure 14 is removed from the mold cavity 126 for a series of finishing steps. As shown, the plugs 102d remain within the receptacles 22 after the sole structure 14 is removed from the mold cavity 126, and must therefore be removed. In the illustrated example, the system 100 may be provided with a punch 134 sized for removing the plugs 102d from the receptacles 22. Particularly, the punch 134 may include a plunger 136 having a width $W_{136}$ that is less than the width of the receptacle 22 and greater than the width $W_{122}$ of the alignment feature 122. Thus, the plunger 136 is configured to be pressed against an end of the plug 102d and through the receptacle 22 to remove the plug 102d from the receptacle 22. Optionally, the punch 134 may include a protrusion 138 configured to engage the alignment feature 122 of the plug 102d. For example, the protrusion 138 may have a width $W_{138}$ operable to be inserted into the alignment feature 122 to maintain a relative position between the plug 102d and the punch 134. In some examples, the punch 134 may be provided in connection with a mechanical press. However, the punch 134 may be manually operated as well.

With the plugs 102d removed from the receptacles 22, the first engagement features 25a (i.e., threads) of the receptacles 22 may be cleaned to ensure all of the plugging material 102 is removed from the receptacle 22. As shown, where the first engagement features 25a are formed as helical threads, a tapping step may include running a tap 140 having corresponding male helical threads through the receptacle 22 to remove any remaining fragments of the plugging material 102. In other examples, where the first engagement features 25a are provided as keyways or other attachment geometries, different tools may be used for cleaning the first engagement features 25a. For example, the first engagement features 25a may be cleaned using fluids, such as compressed air or a vacuum. Once the sole structure 14 is finished, it may be attached to the upper 12 of the article of footwear 10 using conventional methods.

The system 100 and method provided above provide an efficient means for forming molded components including threaded inserts embedded therein. Particularly, the system 100 and method allow the inserts to be attached to a substrate material of a molded component prior to the molding process, and then accurately placed within the mold in predetermined locations. In addition to providing fixturing for the inserts during the molding process, the aforementioned system 100 and method improve the quality of the molded component by preventing contamination of critical features of the insert during the molding process. Particularly, the molded plugs 102d are configured to cover and/or seal the critical features (e.g., threads) such that the critical features can be easily protected. While the present disclosure is provided with respect to the formation of sole structures for articles of footwear, it will be appreciated that the methods discussed herein may apply to formation of other types molded components including any insert having a critical feature that must be unobstructed during use of the component.

The following Clauses provide an exemplary configuration for the method, system, sole structure, and article of footwear described above.

Clause 1. A molded article of forming a molded article, the method comprising the steps of: disposing a plug including a first material within a receptacle of an insert, the receptacle including an engagement feature; placing the insert including the first material into a mold; applying a liquid second material to an exterior surface of the insert; solidifying the liquid second material into a solid, forming the molded article including the insert embedded in the solid second material, wherein a surface of the insert is exposed in the molded article; removing the molded article from the mold; and removing the first material from the receptacle of the insert embedded in the molded article to expose the engagement feature.

Clause 2. The molded article of Clause 1, further comprising forming an alignment feature in the plug, the alignment feature configured to engage a corresponding fixture of the mold.

Clause 3. The molded article of Clause 2, wherein forming the alignment feature includes forming the alignment feature to have an interference fit with the fixture.

Clause 4. The molded article of any one of the preceding Clauses, further comprising molding the plug including the first material within the receptacle to cover the engagement feature.

Clause 5. The molded article of Clause 4, wherein molding the plug includes pressing the plug into the receptacle under the effects of heat and pressure.

Clause 6. The molded article of any one of the preceding Clauses, further comprising attaching the insert to a flexible substrate to form a carcass.

Clause 7. The molded article of Clause 6, wherein the flexible substrate includes a plurality of fibers chosen from carbon fibers, aramid fibers, boron fibers, polymer fibers, glass fibers, or any combination thereof.

Clause 8. The molded article of any one of the preceding Clauses, wherein the first material is an elastomer.

Clause 9. The molded article of any one of the preceding Clauses, wherein applying the liquid second material includes an injection molding process.

Clause 10. The molded article of any one of the preceding Clauses, wherein the insert includes a bushing and a flange extending laterally outwardly from the bushing.

Clause 11. The molded article of Clause 10, wherein the receptacle includes an aperture formed at least partially through the bushing.

Clause 12. The molded article of any one of the preceding Clauses, further comprising forming the first material into the plug prior to placing the first material into the insert.

Clause 13. The molded article of Clause 12, wherein the plug has a first width greater than a second width of the receptacle.

Clause 14. The molded article of any one of the preceding Clauses, wherein removing the first material from the receptacle includes pulling the first material from the receptacle.

Clause 15. The molded article of any one of the preceding Clauses, wherein removing the first material from the receptacle includes applying a vacuum to the receptacle.

Clause 16. The molded article of any one of the preceding Clauses, wherein the molded article is a component of an article of footwear.

Clause 17. The molded article of Clause 16, wherein the component of the article of footwear is a sole structure.

Clause 18. The molded article of Clause 17, wherein the sole structure includes a sole plate configured to be ground-engaging.

Clause 19. A molded article made by the method according to any of the preceding method Clauses.

Clause 20. An article of footwear including the molded article of Clause 19.

Clause 21. A system for forming a sole structure for an article of footwear, the system comprising: a plate mold including a plate mold cavity; an insert disposed within the plate mold cavity and including a receptacle; a plug including a first material disposed within the receptacle of the insert, the first material having a durometer less than 100 Shore 00; and a second material disposed within the plate mold cavity and contacting an exterior surface of the insert.

Clause 22. The system of Clause 21, wherein the receptacle includes an aperture formed through at least one end of the insert and including an engagement feature.

Clause 23. The system of Clause 22, wherein the first material covers the engagement feature and is flush with the at least one end of the insert.

Clause 24. The system of Clause 23, wherein the first material is an elastomer.

Clause 25. The system of any one of the preceding Clauses, wherein the insert is attached to a substrate by stitching.

Clause 26. The system of Clause 25, wherein the second material is disposed within the plate mold cavity and impregnates the substrate.

Clause 27. The system of Clause 26, wherein a first diameter of the plug is greater than a second diameter of the receptacle.

Clause 28. The system of Clause 27, wherein the plug includes an alignment feature.

Clause 29. The system of Clause 28, wherein the plate mold cavity includes a fixture configured to be interference fit with the alignment feature.

Clause 30. The system of any one of the preceding Clauses, wherein the first material extends through an entire length of the insert.

Clause 31. A molded article made using the system according to any of the preceding system Clauses.

Clause 32. An article of footwear including the molded article of Clause 31.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The invention claimed is:

1. A molded article comprising:
an insert including a projection extending from a base, the projection defining a receptacle having a first engagement feature disposed on an inner surface thereof;
a plug including a first material disposed within the receptacle of the projection and including a second engagement feature matingly receiving the first engagement feature to retain the plug within the receptacle, the plug including an alignment feature operable to receive an external structure to align the insert with the external structure; and
a second material surrounding the projection and the base and being spaced apart and separated from the plug.

2. The molded article of claim 1, wherein the external structure is a fixture of a mold.

3. The molded article of claim 2, wherein the fixture extends from a surface within a cavity of the mold, the fixture received by the alignment feature to position the insert relative to the surface of the mold when the second material is applied to the insert.

4. The molded article of claim 3, wherein the alignment feature is a cylindrical bore formed through the plug and the fixture is a cylindrical post, the cylindrical post being received by the cylindrical bore to align the insert relative to the surface of the mold when the second material is applied to the insert.

5. The molded article of claim 4, wherein the cylindrical bore is elongate and extends through a first end of the plug and a second end of the plug.

6. The molded article of claim 1, wherein the first engagement feature includes a first series of threads, the first material of the plug engaging the first series of threads to define the second engagement feature.

7. The molded article of claim 1, wherein the first material is an elastomer.

8. The molded article of claim 1, wherein the base extends laterally outwardly from the projection.

9. A sole structure incorporating the molded article of claim 1.

10. An article of footwear incorporating the molded article of claim 1.

11. A molded article comprising:
an insert including a projection extending from a base, the projection and the base being embedded in a first material; and
a plug including a second material disposed within a receptacle of the projection and being spaced apart and separated from the first material by a wall of the projection, the plug including an alignment feature operable to receive an external structure to align the insert with the external structure.

12. The molded article of claim 11, wherein the external structure is a fixture of a mold.

13. The molded article of claim 12, wherein the fixture extends from a surface within a cavity of the mold, the fixture received by the alignment feature to position the insert relative to the surface of the mold when the first material is applied to the insert.

14. The molded article of claim 13, wherein the alignment feature is a cylindrical bore formed through the plug and the fixture is a cylindrical post, the cylindrical post being received by the cylindrical bore to align the insert relative to the surface of the mold when the first material is applied to the insert.

15. The molded article of claim 14, wherein the cylindrical bore is elongate and extends through a first end of the plug and a second end of the plug.

16. The molded article of claim 11, wherein the insert includes a first series of threads to define a first engagement feature, the second material of the plug engaging the first series of threads to define a second engagement feature that retains the plug within the insert.

17. The molded article of claim 11, wherein the second material is an elastomer.

18. The molded article of claim 11, wherein the base extends laterally outwardly from the projection.

19. A sole structure incorporating the molded article of claim 11.

20. An article of footwear incorporating the molded article of claim 11.

* * * * *